United States Patent [19]

Brent

[11] 4,217,881

[45] Aug. 19, 1980

[54] CONCENTRATING SOLAR COLLECTOR WITH MECHANICAL TRACKING APPARATUS

[76] Inventor: Charles R. Brent, 1206 Velma Ave., Hattiesburg, Miss. 39401

[21] Appl. No.: 946,096

[22] Filed: Sep. 26, 1978

[51] Int. Cl.² ............................................. F24J 3/02
[52] U.S. Cl. .............................. 126/425; 126/439; 126/448
[58] Field of Search ............... 126/271, 270, 438, 439, 126/448, 446, 451, 450, 424, 425; 237/1 A

[56] References Cited

U.S. PATENT DOCUMENTS

| | | | |
|---|---|---|---|
| 3,923,381 | 12/1975 | Winston | 126/270 |
| 4,068,653 | 1/1978 | Bourdon et al. | 126/271 |
| 4,079,725 | 3/1978 | Chadick | 237/1 A |
| 4,092,978 | 6/1978 | Levine | 237/1 A |
| 4,099,515 | 7/1978 | Schertz | 126/271 |
| 4,106,481 | 8/1978 | Van Kuijk | 126/271 |
| 4,108,154 | 8/1978 | Nelson | 126/270 |
| 4,114,594 | 9/1978 | Meyer | 126/271 |
| 4,119,365 | 10/1978 | Powell | 126/271 |
| 4,122,827 | 10/1978 | Rhodes | 126/270 |
| 4,151,408 | 4/1979 | Brown | 126/270 |

*Primary Examiner*—James C. Yeung
*Assistant Examiner*—Daniel O'Connor
*Attorney, Agent, or Firm*—George R. Douglas

[57] ABSTRACT

A hollow cylindrical tubing passing a coolant, a generally V-shaped trough having at the apex thereof a mating semicylindrical surface for engaging said cylindrical tubing and the V-shaped trough disposed about 40° from each other or 20° angularly from a mid-plane of the trough, linkage means for moving the V-shaped trough through an angle that follows an east-to-west path of the sun and maximizing the collection of solar energy and programming means repetitively on a daily term for positioning said V-shaped trough to a start position commencing movement of said V-shaped trough from east-to-west following the sun and terminating said movement for subsequent positioning said V-shaped trough to said start position.

10 Claims, 4 Drawing Figures

CONCENTRATING SOLAR COLLECTOR WITH MECHANICAL TRACKING APPARATUS

CROSS-REFERENCE TO RELATED ART AND INFORMATION MATERIAL TO THIS APPLICATION

This application is an improvement and reduction to practice of my invention disclosed and presented as a reading of a paper at the ERDA Concentrating Solar Collector Conference on Sept. 26, 1977 at 3:45 o'clock p.m., held at Georgia Institute of Technology, Atlanta, Ga. 30332, and a copy thereof as published March, 1978 is incorporated herein by reference as a part of this disclosure. Results of a preliminary novelty investigation conducted relative to the preparation and filing of the application show of cursory interest the U.S. patents as follows: Nos.

| | |
|---|---|
| 3,915,148 | Fletcher, et al. |
| 4,003,638 | Winston |
| 4,004,574 | Barr |
| 4,010,080 | Tsay, et al. |
| 4,020,827 | Broberg |
| 4,078,549 | McKeen, et al. |
| 4,091,798 | Fletcher, et al. |

FIELD OF THE INVENTION

The present invention relates to an improved method and apparatus of concentrating solar collector with mechanical tracking means following the sun's path across the sky east-to-west.

More particularly the invention relates to means for the collection of solar energy by reflection and absorption of the sun's rays to produce heated water at temperatures near the boiling point of water for purposes of air conditioning, heating, and providing process water and means for following the sun's path across the sky. The solar collector described herein is a low form tracking concentrating collector with optimum design to provide a low cost system which produces temperatures high enough to operate absorption-refrigeration systems during a generally six to eight hour period on a clear day.

The solar heater consists of parallel blackened absorption tubes located at the non-imaging focal zone of linear reflecting troughs which pivot around the tubing and are driven by tracking mechanism to track the sun through its apparent east/west traverse across the sky. The absorber tubes, generally in the range from three millimeters to 20 millimeters in diameter (1/10 to ¾ inches), raise the temperature of a circulating fluid which carries the absorbed heat to the point of use within a solar energy system. The tubes and trough are contained in a shallow trough or collector, 75 to 500 millimeter (3 to 20 inches) deep, main frame with one or more covers of transparent material over the top. The tubes and troughs are spaced within the main frame in a manner to make optimum utilization of the space within the main frame in a manner to make optimum utilization of the space for solar collection purposes while allowing for the tracking of the sun by the troughs.

V-shaped troughs and other linear cylindrical or concentrating troughs may be widely used throughout the solar industry but, however, they are used mostly in stationary applications where they are taking advantage of concentration without having to track the hourly traverse of the sun across the sky. Few in the industry seem aware of the additional power which is available to an hour angle tracking concentrating collector and have not attempted to optimize the concentration factors, mass, and other features of low form linear concentrators for tracking the sun in its apparent east/west traverse across the sky. Using low power clock-drive motors and absorber tubes oriented parallel to the earth's axis, these concentrating trough collectors can be made to track the sun to the nearest of about four degrees throughout the year simply by using synchronous motor mechanical tracking systems. Improved cueing using digital clocks can improve the tracking accuracy to provide $\pm 1°$ tracking.

By keeping the tracking troughs low form, with low concentrating factors between 1½ and 3-fold concentration, they can be placed in an insulated enclosure which eliminates wind problems, dust, and dirt, and heat loss problems normally associated with reflecting concentration solar collectors. By using standard off-the-shelf material, such as ⅜" copper tubing, or ¼ through ½ inch tubing of any stainless material, one can minimize the materials cost of the collectors to the point that the overall collector cost can be amortized against fuel savings in solar-total systems.

The concept of the invention as presented here for the V-shaped trough collector given in FIG. 1 is optimized from the following aspects: through wall angles of the V-shaped troughs which are optimized for maximum concentration for the particular depth of the V-shaped trough found in the enclosed collector. The absorber tubing diameter of ⅜ inch is cost optimized and optically optimized for the maximum concentration factor of these low form, V-shaped trough systems. The spacing of the absorber tubes in V-shaped troughs has been optimized to mimimize the dead space between apertures of the V-shaped trough when they are pointing in the vertical position and to minimize eclipsing when they are at their extreme tracking positions, plus or minus 70° from vertical. Selective coatings of the tubing surface provide optimum solar collection ability while the tubing surface itself minimizes the area which has to be surface. The mass of the tracking troughs, or their moment of inertia is kept small enough so that low power, less than 25-watt clock drive motors, can, through a tracking bar, cause up to 30 of these troughs to track the sun in unison. The insulation mounted in the sides and bottom of the collector has been optimized from both the standpoints of maximum allowable heat loss and minimum cost.

Two glass covers over the top of the collector provide insulation necessary to attain the high temperatures required for solar cooling applications. The concept of cost optimization through low form, low mass, tracking-trough collectors which are optimized to produce to 99° C. water (210° F.) is so unique in solar energy collectors that it represents the basic discovery or basic principle. The combined use of low form, low mass, linear trough reflectors around small absorbing tubes which track the sun through its east/west traverse across the sky throughout the year using low-wattage, synchronous clock-drive motors and mechanical connections causing a whole battery of these troughs to move in unison (the troughs being in a nominal 99° C. 210° F. range). These combined advantages allow the inventor to claim this invention as one which is not likely to be equaled in its ability to deliver power for solar cooling and other applications requiring high temperature water as an energy source.

This invention in its primary application prevents so many of the drawbacks of tracking collectors such as wind loading heat loss, wind damage, dust and dirt collecting on reflector surfaces, and non-critical tracking requirements, that it can allow low cost mechanical tracking.

BACKGROUND OF THE INVENTION

It is thought that before there may be a breakthrough in solar energy conservation in the South there is expected to be a system that will efficiently achieve both solar cooling and solar heating. To cool with using solar energy one has to achieve relatively high temperature by using absorption refrigeration system such as a gas refrigeration and air conditioning system and may include that made by SERVEL ARKLA Industries and other type gas refrigerator and gas air conditioning systems, which operate off of heat supplies. By heating water to 210° F. then one can operate a commercial model of a solar air conditioning system but it requires collections that will achieve water heated to 210° F., near the boiling point of water. Most of the so-called flat plate solar collectors cannot efficiently achieve this, a significant or commercial degree of efficiency.

By solar collectors concentrating the sun's rays on a smaller area which increases the solar flux and one is able to create higher temperatures. By apparatus and method of the present invention high temperatures are realized.

A breakthrough in solar energy is dependent on economic breakthrough. All types of solar collectors can be contemplated that can be afforded in cost. For example, photo-voltaic systems are so expensive that they cannot be reasonably afforded. Similarly, tremendously large radar dish-type tracking mechanisms can be conceived that are not affordable by the large public. The aim and object of the present invention is to optimize the economics, the materials and the scientific idea and knowledge available to provide a high temperature water by a solar collector for absorption air conditioning and one way to do it is to concentrate the sun's rays and track the sun from east-to-west across the sky. The present invention contemplates an optimum arrangement of tracking and solar concentrating collector systems that minimize cost and other known problems associated with the prior art and known device. One of the known major problems of solar tracking collectors is that they usually have slip joints in liquid flow systems that after continued use commence to realize defects and other leak and result in inoperativeness. In the present system these defects are sought to be eliminated so use of slip joints through which refrigerant or other medium or liquid might soon leak are not included in the system. Basically the system of the invention is to provide a rigidly constructed heat exchanger system in which a movable solar tracking arrangement is provided to focus the solar energy on to the series copper cylindrical tubes formed as heat sinks or black bodies. The tracking arrangement is a collection of reflectors of solar energy or sun's flux and in which the copper cylindrical tubes act as a pivot or fulcrum around which the concentrating reflectors may move so the axis or center of a trough reflector follows or tracks the sun's apparent movement across the sky.

By keeping V-shaped troughs of the solar reflector optimized and generally shallow, at an optimum angle from a center plane of the trough and constructed of a light material such as aluminum, there is ease in providing continuous tracking and mechanically following the sun because of the low movement of inertia or mass.

Thus the invention realizes that the tracking system may use a programmable clock movement and controlled motor to commence the tracking until it becomes inefficient in the evening. Plurality of such troughs are levered together to operate in parallel or in tandem and by the shallow construction of the trough and a ⅜ inch or ½ inch copper tubing, all of the sun's light that may enter the trough may end up on a black absorber surface of the copper tubing. The coating on the tubing may be black paint or selective black coating made integral with the tubing, which is better since it does not tend to wear off.

As a matter of fact, the V-shaped trough is sufficiently shallow that were it any deeper the sun's rays would impinge and reflect along the V-shaped trough and reflect out of the V-shaped trough where it would be lost for solar collection. Similarly if the angle of the trough were significantly different than the optimized angle of 20° from the mid-plane of the V-shaped trough, or a total of 40° angle for the reflective walls of the V-shaped trough with respect to each other, then some solar energy would also be lost to the trough.

By use of the V-shaped trough over an idealized parabolic trough, accuracy in directing the V-shaped trough need not be as critical as in directing a parabolic or otherwise configured trough or collector.

SUMMARY OF THE INVENTION

An object and advantage of the present invention is to provide a concentrating solar collector with mechanical tracking apparatus that optimizes cost effectiveness, versatility in setting or resetting times that the mechanical tracking apparatus commences to operate during the cycle of the sun moving from east-to-west, constructing the reflecting and tracking V-shaped troughs of aluminum, stainless steel or other highly reflective material and providing a black coated copper tubing of cylindrical construction at the apex of the V-shaped trough to receive and collect solar energy that impinges within the V-shaped trough.

Another advantage and feature of the invention is to provide an energy transmissive sheet on one side of the arrangement of V-shaped troughs and the mechanical tracking means and to provide insulation material on the other side or bottom of the collector arrangement. Another advantage and feature of the present invention is to provide a solar collector for absorption cooling, heating and/or hot water heating, and in which the range of water heating is or exceeds 210° F.

Another and further object of the present invention is to provide a simplistic construction of solar collector elements in which the collector is mechanically driven to follow the sun and the apex of the collector is a cylindrically shaped stationary and supported copper or other metal tube having a black body surface or formed as a heat sink and forms also a pivot for the solar collector. Linkage means provides moving the trough or collector through an angle that follows the path of the sun.

More particularly an object of the invention is to provide a motor control means for repetitively and mechanically tracking the sun so that the control means has a resetable starting time as programmed by a digital or selectable clock actuated signal means.

BRIEF DESCRIPTION OF THE DRAWINGS

The above and other objects and advantages of the invention will become apparent upon full consideration of the following detailed description and accompanying drawings in which.

DETAILED DESCRIPTION OF THE PREFERRED EMBODIMENT OF THE INVENTION

Figure 2:
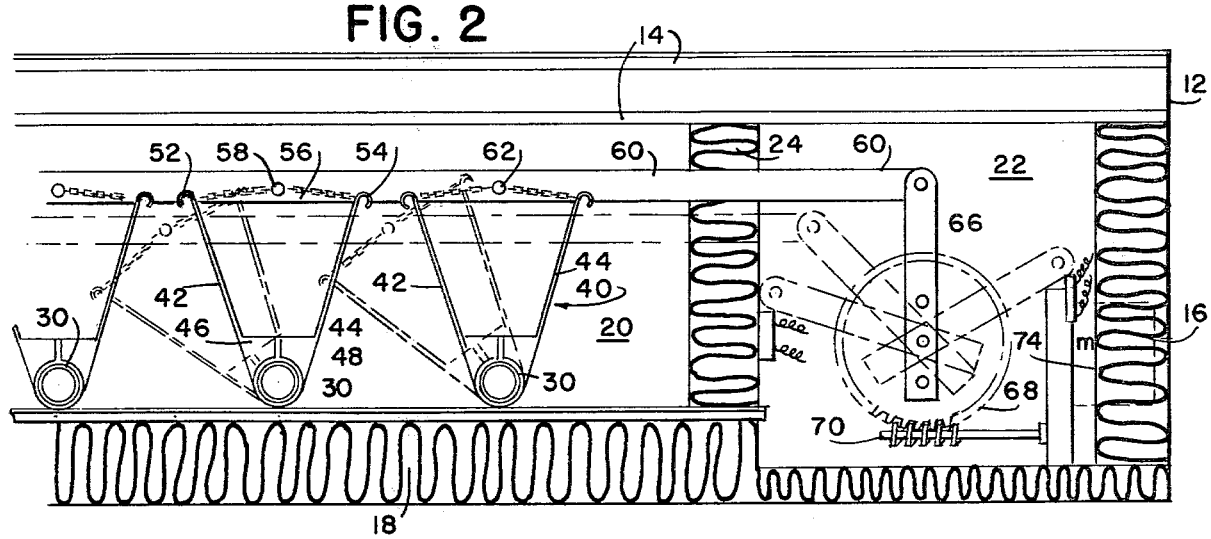
FIG. 2 is a cross-sectional and side view taken on an enlarged and expanded scale along line 2—2 of FIG. 1.
Figure 1:
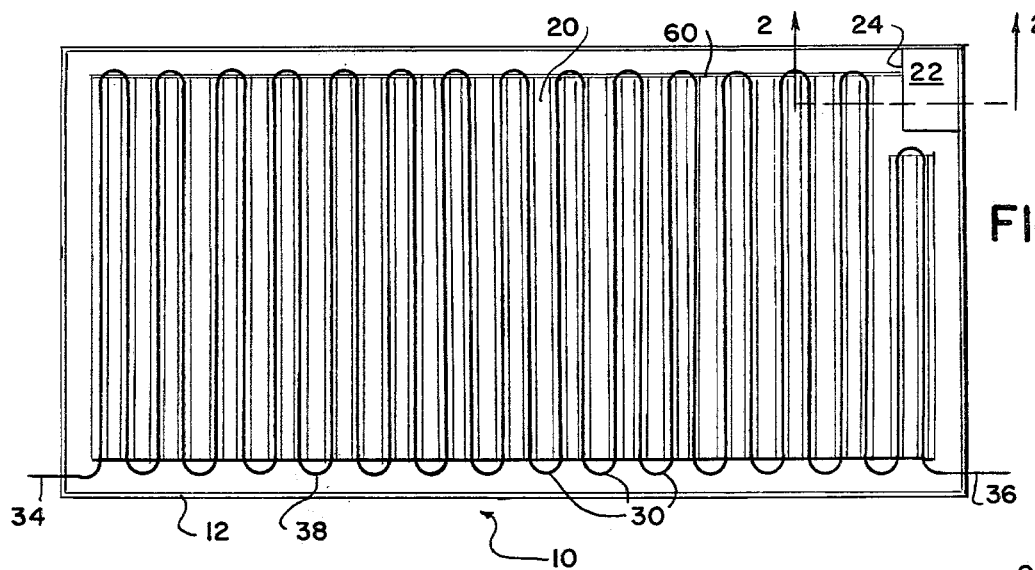
FIG. 1 is a plan view of a preferred embodiment and best mode of a concentrating solar collector having tracking apparatus so the solar collector follows the path of the sun from east-to-west.

Referring now to the drawings there is shown in FIG. 1 a plan view of a concentrating solar collector 25 and mechanical tracking means 10 disposed in a receptacle 12 having its top surface of a glass plate 14 as shown in FIG. 2 and which is transmissible to solar energy. The glass plate 14 may be comprised of a pair of glass plates separated by a small half-inch or the like air space. Sides and bottom areas of the receptacle 14 may have thermally insulation walls 16, 18 as shown in FIG. 2 and within the receptacle 12 there is a solar collector space 20, a tracking mechanism space 22 and a separating insulating wall member 24 therebetween. In the solar collector space 20 there are a plurality of generally parallel hollow metal tubing elements or tubing 30, 30, 30 which may be connected between a header on one side (not shown) and a collector on the other side (not shown) or these sets of metal tubing may be connected in a serpentine fashion as shown in FIG. 1 having an inlet tubing pipe 34 and an outlet tubing pipe 36. The tubing may be constructed of any good heat conductor of metal and the like and in a preferred embodiment it is constructed of copper which is coated by black paint or a black body surface for maximizing the absorption of heat energy. The pipes are supported at each end by support means engaging the turn portion 38 of the tubing 30.

Figure 3:
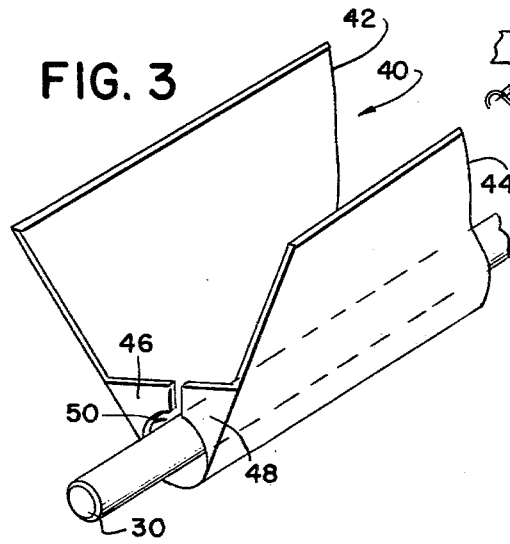
FIG. 3 is a perspective and enlarged view showing how the solar collector unit is formed to be pivotally rotated on the cylindrical copper tubing as shown.

In FIGS. 1, 2 and 3 there are shown solar collectors 40 to concentrate, focus and direct solar energy onto tubing 30 located at the apex of the solar collector and each collector is provided with a set of angularly disposed walls 42, 44. The side walls 42, 44 have constructed at each side thereof of adjacent the mid-portion a set of mating tabs 46, 48 as shown in FIGS. 2 and 3 such that the tabs fold toward each other for forming a closure upon the tubing 30 and may be effected to form a bearing or frictional surface 50 that engages the tubing 30 as shown in FIG. 3. Side walls 42, 44 are tangentially joined at a point below tube 30 and rest upon a horizontal base surface which is positioned above lower insulation 18.

Figure 4:
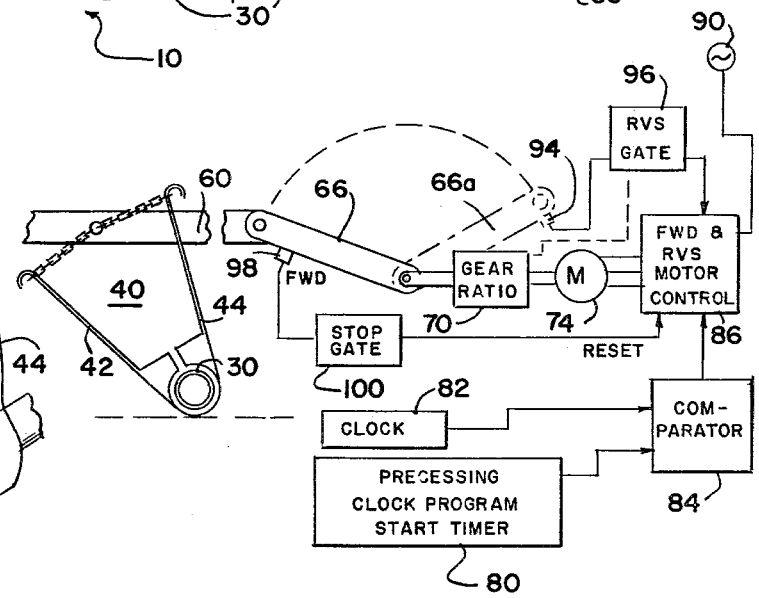
FIG. 4 is a schematic and block diagram showing the control means for repetitively and mechanically tracking the sun by a resetable starting time programmed according to a specified time selected after local sunrise.

At the distal or far end of the solar collector 40 there are hook members 52, 54 at the extremity of the solar collector 40 and to which there is a chain element 56 or other mechanical linkage or member that is used to provide a mid-point 58 to which is connected a lever 60 connected by a rivet 62. One end of the linkage or lever 60 is pivotaly connected within the mechanical tracking space 22 to a lever 66 and a gear 68 which is connected to a pinion or gear ratio means 70 which in turn is driven by motor 74 as shown in FIG. 2 and FIG. 4.

Directing the attention of the collector, the solar collector is constructed of a V-shaped trough having energy reflecting or mirror type surfaces for reflecting the solar energy within the trough and between walls 42, 44 so that the energy is directed and finally collected upon and on the black heat absorbing surface of the tubing 30. The walls 42, 44 are constructed so that they are disposed about 40° from each other and the walls terminate at a vertex or apex below the tubing 30. A mid-plane of the solar collector 40 is defined as being disposed angularly about 20° from the walls so that the mid-plane (not shown) bisects the V-shaped trough.

The rear surface of the receptacle 10 is inclined for a north direction at an angle from the horizontal that is substantially equivalent to the angle of latitude at that place where the solar collector is being used.

The copper tubing is constructed to have about a $\frac{3}{8}$ inch or $\frac{1}{2}$ inch diameter and the V-shaped trough pivots through an angle of about 120° of hour angle, the V-shaped trough 40 having a depth of about 2$\frac{1}{2}$ inches which optimizes the efficient transfer and collection of solar energy within the collector 40 so that it is directed to the coolant flow within the hollow tubing 30.

The motor 74 is a low power synchronous timing motor for driving the V-shaped troughs 40 at a general rate of 15° per hour. The efficient and useful operation of the system apparatus provides that the driving motor 74 starts about eight o'clock sun time to about 4:30 sun time or solar time ± about 15°, and this is accomplished by providing a precessing clock program start timer 80, a clock 82, a comparator 84, and a forward and reverse motor control 86 for driving selectively the motor 74. The precessing timer 80 provides that, depending upon the time of year that the motor 74 starts at times such as 8:30, 8:32, 8:36, 8:38, and so forth as the sun precesses during the year, in this way the sun is considered to be intersecting the mid-plane described above that bisects the solar collector 40.

Within the receptacle 12 and disposed at the bottom thereof as shown in FIG. 2, the insulating material 18 may be of Fiberglass commercially available and it provides a lining behind the solar collector array 40, 40, 40.

The precessing clock programmer or timer 80 provides an alarm or signal that may be in the form of a digital clock or other selectably adjustable output signal preset by a program that provides a signal that reaches the forward and reverse motor control unit 86 to initiate the tracking step of the invention. The control unit 86 energized from a source 90 energizes the synchronous motors 74 for driving arm 66 from a left position to a right position shown as 66A or from an east position to a west position. When the arm 66 reaches position 66A it contacts a sensing unit or microswitch 94 that actuates a reverse gate 96 that by its output connected to the control unit 86 reverses the mechanical output of the motor 74 so that the arm 66A is returned to position 66 whereupon it engages a sensor element or microswitch 98 that energizes a STOP gate 100 having an output to reset the forward and reverse motor control unit 86 so that the arm 66 is capable of being started by the precessing timer 80 on the following day or given period.

While it is not required, it may be that the comparator 86 may simultaneously provide an output to control unit 86 on the concurrence of a clock signal 82 and the precessing timer 80.

The forward motor control unit 86 may be actuated or triggered directly from the clock or from the precessing clock timer 80 and the comparator 84 may be eliminated.

It is seen by the apparatus of the present invention disclosure that there is provided a solar collector 40 that may be driven to follow the sun across the sky at a rate of 15° per hour so that it follows in synchronism the path of the sun and receives solar energy.

There is provided by the practice of the present invention an economical and efficient reliable and operable sun collector that may be manufactured at nominal operating cost and operating at temperatures for the purposes desired.

One arrangement in which the clock 82 and the start timer 80 with comparator 84 find an appropriate significant function is where there has been a power loss or power shut-down due to circumstances such as an act of God or the like, then the precessing timer 80 because of its program control and selectivity, not being subject to power line domination, is connected and operable to actuate the comparator at the precise time where the clock 82 has been shut-down but is back on power during the morning period that the precessing timer 80 is due to come on.

The solar collector 40 is constructed to achieve a large or efficient concentrating ratio and this is defined as the ratio of the effective aperture distance measured from one free end to the other free end of the solar collector divided by the total distance of the absorber taken in the same or parallel direction, and this is usually the circumferential exposed distance around the cylindrical tubing, an amount which is shortly less than the semi-diameter of the copper tubing. It may also be stated that the concentrating ratio of the solar collector of the present invention is a ratio of about 2 to 1.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A concentrating solar collector with mechanical tracking apparatus comprising a hollow tubing of metal constructed to have an outer cylindrical configuration throughout a substantial given length and for passing a coolant therethrough, a V-shaped trough having energy reflecting surfaces disposed on inside surface walls of the V-shaped trough, the surface walls angularly disposed about 20° from a mid-plane bisecting the V-shaped trough, wherein tab elements are formed at the vertex end of the V-shaped trough and folded over the hollow tubing to provide holding means for supporting said V-shaped trough upon said cylindrical configuration of said hollow tubing, said V-shaped trough having a cylindrically formed element at its section tangentially joining the two surface walls being used to support the solar collector and said trough arrangement upon a base surface, the upper ends of said V-shaped troughs having a mechanical linkage means affixed thereto and extending therebetween with the approximate midpoint of said linkage means being connected to a driving lever means for moving the V-shaped trough through an angle that follows the east-to-west path of the sun, a protective insulating envelope surrounding the entire solar collector apparatus and the portion exposed to solar radiation being solar transmissive, and motor control means driving the lever means and being controlled by a resetable starting time program operable by digital clock means for the V-shaped trough to repetitively mechanically track the sun.

2. The invention according to claim 1 wherein a series of elements of said hollow tubing are disposed in a parallel serpentine fashion to form a series of said elements.

3. The invention according to claim 1 wherein a series of elements of said hollow tubing are disposed in a parallel array and are connected in a series of paths terminating in a header for collecting the heated media supplied by a source header feeding the other end of the elements of hollow tubing.

4. The invention according to claim 1 wherein said hollow tubing is of copper having a black body surface maximizing the absorption of heat energy.

5. The invention according to claim 1 wherein said hollow tubing has an outside diameter between about $\frac{3}{8}$ inch to $\frac{1}{2}$ inch, the V-shaped trough pivots through an angle of about 120° of hour angle and the V-shaped trough has a depth of about $2\frac{1}{2}$ inches for optimizing the efficient transfer of sun energy to the coolant within the hollow tubing.

6. The invention of claim 1 wherein a linkage means is coupled through gear ratio means coupled to a low power synchronous timing motor and driving the V-shaped trough at a rate of 15° per hour from about 8:00 a.m. to about 4:30 p.m. solar time plus or minus 15 minutes, said surfaces of said V-shaped trough having a concentrating ratio of about 2 to 1 on the hollow tubing.

7. The invention according to claim 1 wherein a base of insulation material such as Fiberglass provides a lining behind the solar collector apparatus.

8. The invention of claim 1 wherein a mirror polished surface is provided interiorly of the V-shaped trough and assisting in focusing and reflecting solar energy onto the hollow cylindrical tubing 9. The invention according to claim 1 wherein said V-shaped trough is any linear or cylindrical concentrating nonimaging trough capable of pivoting around the pipe tubing proximate to a focal point of the trough.

10. The invention according to claim 1 wherein said V-shaped trough is configured as a compound parabolic collector, linear concentrating trough having the pipe tubing proximate to a focal point of the trough.

* * * * *